UNITED STATES PATENT OFFICE.

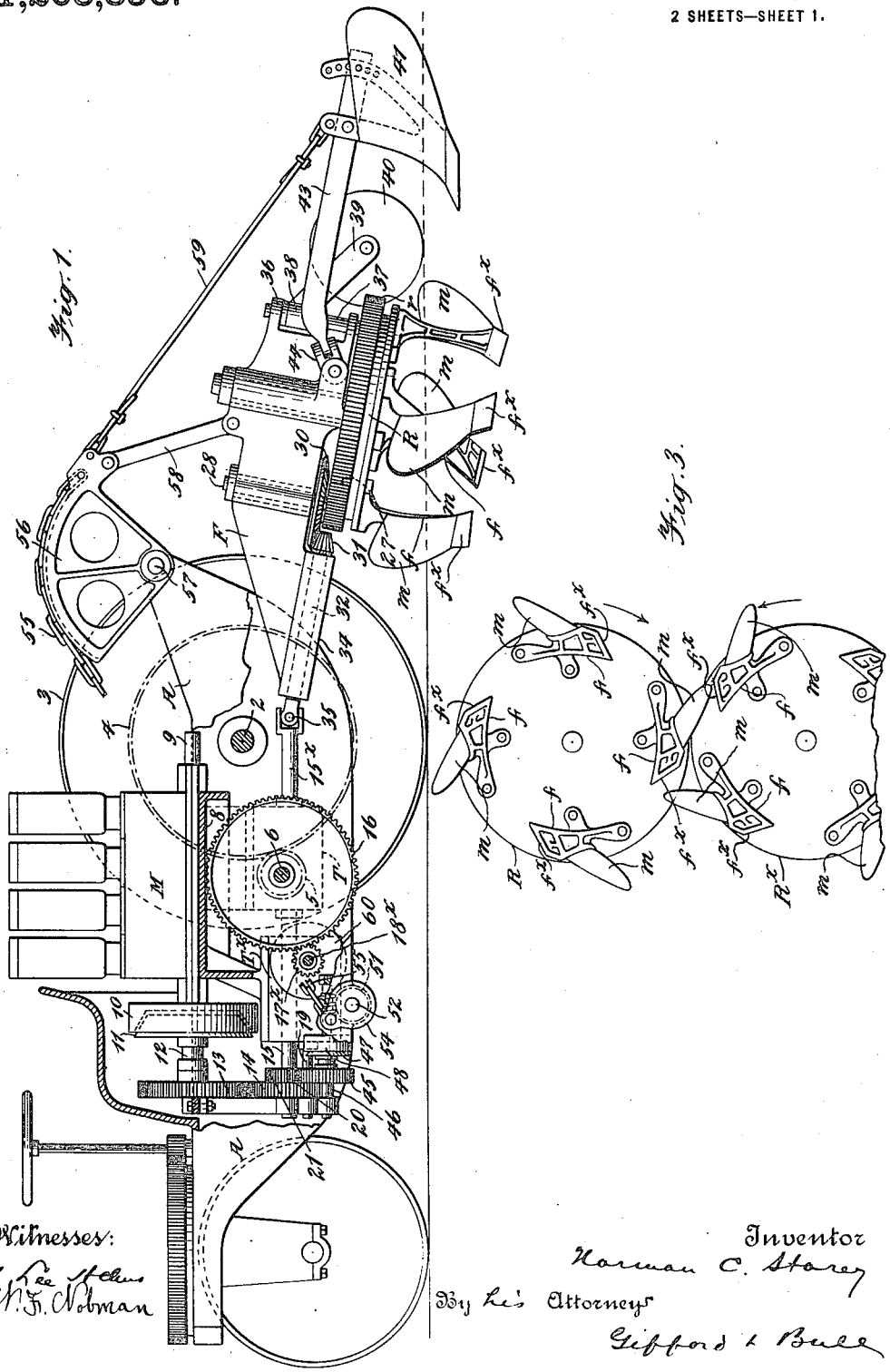

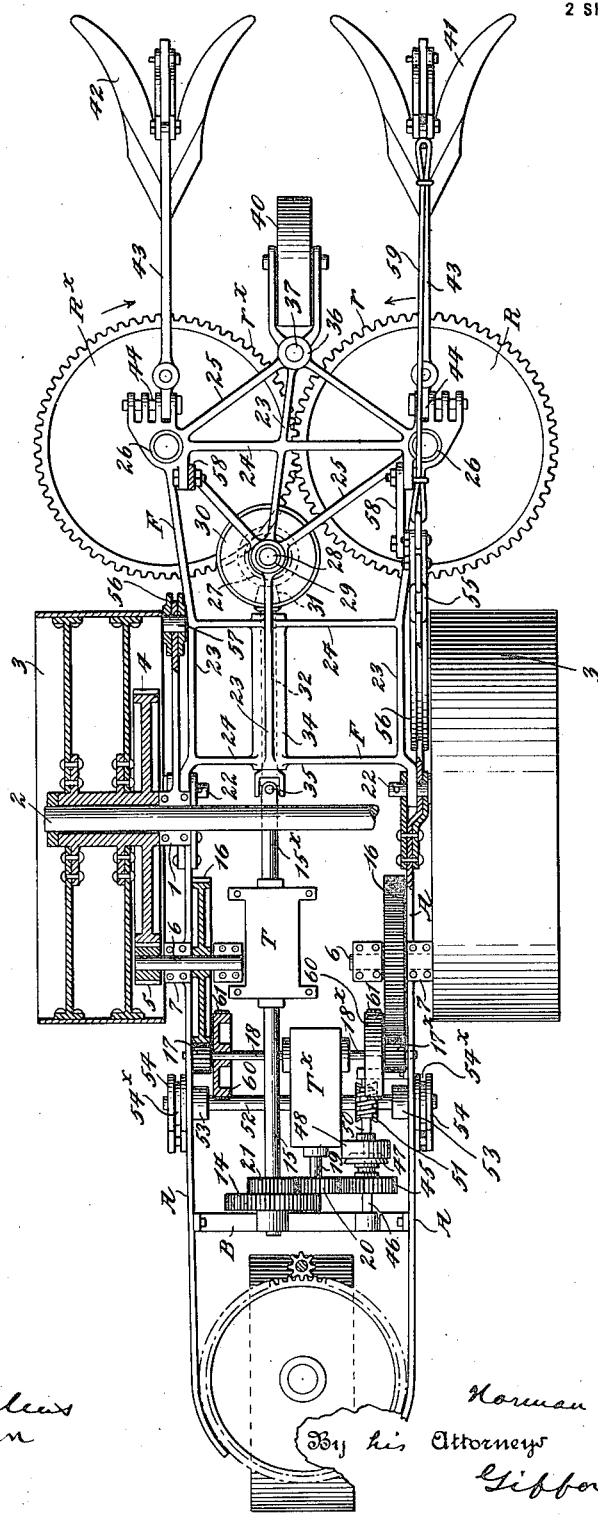

NORMAN C. STOREY, OF AGUIRRE, PORTO RICO.

MOTOR-DRIVEN TILLING-MACHINE.

1,208,856.

Specification of Letters Patent.   Patented Dec. 19, 1916.

Application filed January 3, 1916.   Serial No. 70,915.

*To all whom it may concern:*

Be it known that I, NORMAN C. STOREY, a citizen of the United States, residing in Aguirre, Porto Rico, West Indies, have invented certain new and useful Improvements in Motor-Driven Tilling-Machines, of which the following is a specification, reference being had herein to the accompanying drawings.

The object of my invention is to provide a motor-driven tilling machine comprising a wheeled frame provided with a motor and suitable propelling mechanism for the traction wheels and one or more implement-carrying rotors carried by the frame. Each tilling implement is formed with a front cutting edge, which is active as the implement moves in its circular path, and also with a laterally bent cutting plate having an edge which is active when the implement is dragged laterally.

A second object of my invention is to form the tilling implement with a lower blade or share and an overlying earth-turning plate or mold board, and to maintain the rotor in inclined relation to the frame so as to locate the path of the earth-turning plate or mold board substantially above the ground when the tilling implement is in its foremost position.

A third object of my invention is to provide a novel arrangement of the driving elements for my wheeled frame and rotor.

In the drawings Figure 1 is a side elevation of a machine embodying my improvements, the same being partly in section, and Fig. 2 is a plan view of the same. Fig. 3 is a bottom plan view of two connected rotors each carrying multiple tilling implements.

The main frame of the machine may be of any suitable construction, and in the present embodiment of the invention comprises the side plates A preferably formed of steel and rigidly connected by means of cross beams such as B, the frame being provided with alined apertured bosses 1 to receive the axle 2 for the broad traction wheels 3. The hub of each traction wheel has fixed thereon a gear wheel 4 engaged by a pinion 5 on the end of the short shaft 6 journaled within a boss 7 integral with each frame plate A, the shaft being driven by suitable connections with a motor carried by the frame, in the manner hereinafter described.

The motor designated by the letter M, Fig. 1, is supported upon the transverse frame plate 8. The motor shaft 9 has fixed thereon the friction drum 10 adapted to be engaged by the friction face of clutch wheel 11 keyed on a shaft 12 suitably journaled in the frame and provided with a gear 13 meshing with a second gear 14 which is keyed on a shaft 15, the latter shaft entering a transmission T of any suitable construction, but preferably capable of three speeds ahead, a neutral position, and one speed reverse. Leading from the transmission T is the transmission shaft $15^x$ which serves to drive the implement carrying rotor or rotors.

Means are provided for driving the traction wheels 3 at multispeeds and differentially. To this end each of the pinion-carrying shafts 6 has fixed thereon a gear-wheel 16 driven by a pinion 17, $17^x$, on differential shaft 18, $18^x$, extending transversely of and journaled in suitable bearings afforded by the frame. Differential shafts 18, $18^x$ lead from a transmission $T^x$ having inclosed therewith a suitable differential mechanism, the transmission being preferably of the automobile type of three speeds ahead and one speed reverse. The driving shaft 19 of transmission $T^x$ is provided with a pinion 20 meshing with a second pinion 21 on shaft 15 driven by the motor.

Pivotally connected with the main frame by means of the pins 22 is the rotor frame F comprising the longitudinal bars 23, the cross bars 24 and the diamond-frame 25 connected with, and reinforced by, the said bars. Each point of the diamond-frame is formed with a bearing boss. The bearing bosses 26 receive the shafts of the two rotors, R, $R^x$ formed with the meshing gear-wheels, $r$, $r^x$, gear wheel $r^x$ being driven by means of a pinion 27 carried by a short shaft 28. Shaft 28 rotates within boss 29 of the diamond-frame and has fixed thereon a beveled gear 30 meshing with a similar gear 31 on the end of shaft 32 journaled in boss 34 of frame F and connected for universal movement at 35 with transmission shaft $15^x$.

Fixed within boss 36 of the diamond-frame is a shaft 37 upon which is loosely mounted the sleeve 38 of a frame 39 in which rotates the depth-gage wheel 40. At the rear of the latter are the trench-forming implements 41, 42, each adjustably mounted upon a supporting beam 43 pivotally connected at 44 with the rotor frame F.

Each rotor, in the present embodiment of the invention, is provided with four tilling implements, each implement being formed with a front cutting edge $f$, a laterally extending cutting face $f^x$ and an earth-turning plate or mold board $m$. The front cutting edge $f$ of each implement is active as the latter moves in its circular path, and the laterally extending or outwardly bent cutting face $f^x$ is active when the implement moves into extreme forward position and is dragged laterally by the machine.

It will be seen that the weight of frame F, with its connected parts, will cause the rotors to assume the inclined position illustrated in Fig. 1 when the same are in action, the depth gage wheel 40 serving to maintain the desired inclination and to locate the path of the earth-turning plates $m$ substantially above the uncut earth, when each implement in its rotation moves into forward position crosswise of the frame and is dragged laterally.

Motor-driven means are provided for elevating the rotors and trenching implements into and out of operative position. To this end pinion 20 on transmission driving shaft 19 meshes with gear 45 on a shaft 46 having keyed thereon a clutch member 47 adapted to engage the friction face of a drum 48 keyed on a worm shaft 50. The said clutch members may be thrown into and out of action by any suitable shifting device. The worm on shaft 50 operates a pinion 51 fast upon a shaft 52 journaled in the bearing bosses 53 on the frame plates A and formed with projections beyond said plates to receive the crank disks 54, each disk being channeled at $54^x$ to receive one of the two rotor lifting-chains 55 each of which is connected at its forward end with the crank projection of one disk 54. Near its opposite end each chain 55 (one only being illustrated) lies within the channeled seat of a segment lever 56 fulcrumed at 57 upon frame plate A, and connected by link 58 with the rotor frame F. Each segment lever 56 also is connected by means of a chain or the like, indicated at 59, with one of the trenching implements 41, so that by means of the clutch device 47, 48, both the implement-carrying rotors and the trenching implements may be elevated above the ground when it is desired to transport the machine to or from a field.

The differential shafts 18, $18^x$ enable the operator to give a short turn to the machine when necessary, each shaft being provided with a brake drum 60 embraced by a brake band 61 which may be manipulated by any suitable means to reduce the speed of rotation of one shaft and hence to differentially change the speed of rotation of the traction wheels.

It will be understood that I do not limit myself to the precise embodiment of the invention herein described and illustrated. For instance, the earth deflecting plate $m$ of the tilling implements may be of any suitable form, or may be dispensed with altogether; and blade or share of the implement may be laterally curved, as shown, or angularly bent, to insure its cutting action when given a sidewise movement.

What I claim and desire to secure by Letters Patent of the United States is:—

1. In a tilling machine, the combination with a frame provided with traction wheels, of a rotor and means for rotating the same, a tilling implement carried by the rotor and comprising a blade and an overhanging earth-turning plate, and connections between the frame and the rotor whereby the latter may be maintained in inclined relation to the frame and the path of movement of the earth-turning plate located above the ground when the tilling implement is in its foremost position with respect to the frame.

2. In a tilling machine, a revolving implement-carrying device mounted to operate on an inclined plane in relation to the ground, means for rotating said device, implements mounted upon and traveling around the axis of the revolving implement-carrying device and adapted to turn or push the plowed earth away from their axis of rotation, said implements being continually active in untilled earth and having a forward movement in the direction from the low to the high side of the said plane to cut a curtate cycloid path.

In testimony whereof I have hereunto signed my name in the presence of two subscribing witnesses.

NORMAN C. STOREY.

Witnesses:
FRANK L. HENNESSY,
C. P. DUNCAN.